United States Patent
Wang et al.

(10) Patent No.: US 12,180,326 B2
(45) Date of Patent: Dec. 31, 2024

(54) LOW DENSITY POLYURETHANE FOAM SYSTEMS WITH HIGH SPLIT TEAR

(71) Applicant: BASF SE, Ludwigshafen am Rhein (DE)

(72) Inventors: Cai An Wang, Shanghai (CN); Chang Xi Li, Shanghai (CN); Ren Zheng Zhang, Shanghai (CN)

(73) Assignee: BASF SE, Ludwigshafen am Rhein (DE)

( * ) Notice: Subject to any disclaimer, the term of this patent is extended or adjusted under 35 U.S.C. 154(b) by 580 days.

(21) Appl. No.: 17/609,607

(22) PCT Filed: Apr. 29, 2020

(86) PCT No.: PCT/EP2020/061818
§ 371 (c)(1),
(2) Date: Nov. 8, 2021

(87) PCT Pub. No.: WO2020/229170
PCT Pub. Date: Nov. 19, 2020

(65) Prior Publication Data
US 2022/0227917 A1 Jul. 21, 2022

(30) Foreign Application Priority Data
May 16, 2019 (WO) ............... PCT/CN2019/087213

(51) Int. Cl.
*C08G 18/48* (2006.01)
*C08G 18/10* (2006.01)
(Continued)

(52) U.S. Cl.
CPC ......... *C08G 18/4854* (2013.01); *C08G 18/10* (2013.01); *C08G 18/3206* (2013.01);
(Continued)

(58) Field of Classification Search
CPC ............... C08G 18/4854; C08G 18/10; C08G 18/3206; C08G 18/3275; C08G 18/66;
(Continued)

(56) References Cited

U.S. PATENT DOCUMENTS 9,850,360 B2 * 12/2017 Prissok .................. C08J 9/32
11,332,569 B2 * 5/2022 Scussolin ............. C08G 18/485
(Continued)

FOREIGN PATENT DOCUMENTS

| CN | 2000343412 A | 12/2000 |
| CN | 101486801 B | 5/2012 |

(Continued)

OTHER PUBLICATIONS

International Search Report for corresponding PCT/EP2020/061818 mailed Aug. 27, 2020, 8 Pages.

*Primary Examiner* — Michael M. Bernshteyn
(74) *Attorney, Agent, or Firm* — Armstrong Teasdale LLP

(57) ABSTRACT

Described herein is a polyurethane foam produced in a "one shot process" that has low density, is semi-hard, and displays a high rebound value all while providing superior split tear performance. The polyurethane foam can be used in a "one shot process" to produce a shoe sole, a mid-sole or an insole for a shoe. The shoe sole may be used for forming an outer sole of a sandal type shoe, a midsole of an athletic type shoe, or an insole for insertion into any type of shoe.

15 Claims, 1 Drawing Sheet

(51) Int. Cl.
  *C08G 18/32* (2006.01)
  *C08G 18/66* (2006.01)
  *C08J 9/12* (2006.01)
  *C08J 9/228* (2006.01)
  *C08J 9/32* (2006.01)

(52) U.S. Cl.
  CPC ......... *C08G 18/3275* (2013.01); *C08G 18/66* (2013.01); *C08J 9/125* (2013.01); *C08J 9/228* (2013.01); *C08J 9/32* (2013.01); *C08G 2110/0066* (2021.01); *C08J 2203/10* (2013.01); *C08J 2203/22* (2013.01); *C08J 2375/08* (2013.01)

(58) Field of Classification Search
  CPC ... C08G 2110/0066; C08J 9/125; C08J 9/228; C08J 9/32; C08J 2203/10; C08J 2203/22; C08J 2375/08
  USPC .......................................................... 521/174
  See application file for complete search history.

(56) References Cited

U.S. PATENT DOCUMENTS

| | | | |
|---|---|---|---|
| 2012/0059075 A1* | 3/2012 | Prissok | C08L 75/04 264/41 |
| 2012/0065341 A1* | 3/2012 | Eling | C08G 77/452 525/450 |
| 2016/0264710 A1* | 9/2016 | Eling | C08G 18/3893 |

FOREIGN PATENT DOCUMENTS

| | | |
|---|---|---|
| CN | 2019178519 A | 10/2019 |
| CN | 2019189804 A | 10/2019 |
| JP | 2000344850 A | 12/2000 |
| JP | 2011157452 A | 8/2011 |
| WO | 2018160945 A1 | 9/2018 |

* cited by examiner

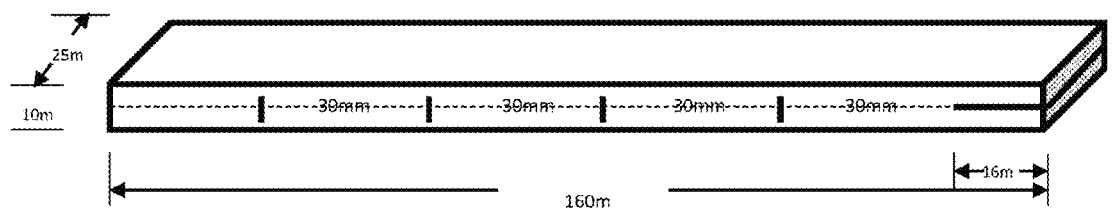

LOW DENSITY POLYURETHANE FOAM SYSTEMS WITH HIGH SPLIT TEAR

CROSS-REFERENCE TO RELATED APPLICATIONS

This application is a U.S. National Phase Application of International Patent Application No. PCT/EP2020/061818, filed Apr. 29, 2020, which claims priority to International Patent Application No. PCT/CN2019/087213, filed May 16, 2019, the entire contents of which are hereby incorporated by reference herein.

FIELD OF THE INVENTION

The present invention relates to a low density polyurethane foam useful in footwear application with high split.

BACKGROUND

Polyurethane (PU) is a polymer composed of organic units joined by carbamate (urethane) links. Polyurethane polymers are typically produced by the reaction of an isocyanate with at least two isocyanate groups with a polyol with at least two hydroxyl groups. Polyurethanes are used in the manufacture of high-resilience foam seating, footwear, rigid foam insulation panels, microcellular foam seals and gaskets, durable elastomeric wheels and tires, automotive suspension bushings, electrical potting compounds, high performance adhesives, surface coatings and surface sealants, synthetic fibers, carpet underlay, hard-plastic parts, hoses and so on.

When polyurethanes are used in the form of foams in applications such as soles for footwear, they could provide light weight with highly abrasion-resistant properties. Applications for such PU foams include a wide range of footwear types such as sports and trekking shoes and boots along with shoes for business and fashion shoe soles, as well as high-quality safety shoes. To achieve light weight soles the PU foam needs to have a low density (e.g., no greater than 400 grams/liter). In addition to light weight, the PU foam also needs to have sufficient hardness (e.g., Shore A hardness above 40), high rebound properties (higher than 50%), low compression set (lower than 20%), and good split tear (e.g. split tear is above 1.8 N/mm). Split tear is a highlighted mechanical property of microcellur polyurethane foam for footwear application.

CN101486801B discloses a low-density microporous polyurethane elastomer added with a thermal foaming microsphere and a preparation method thereof. By adding the thermal foaming microsphere, the invention prepares a low-density (0.28-0.32 g/cm) microporous polyurethane elastomer which is applied to the sole material; the obtained material has excellent additive mechanical property WO2018/160945A1 discloses a polyurethane elastomer foam having improved mechanical properties such as ball rebound prepared using the reaction product of a combination of polytetramethylene ether glycol (polytetrahydrofuran) having a molecular weight of 1900 to 2100 and hydroxyl value of 53 to 60, and monoethylene glycol, and 4,4'-diphenylmethane diisocyanate (4,4'-MDI) as isocyanate prepolymer.

However, none of these applications describe how to produce a low-density polyurethane foam system with high split tear performance, which could be used as soles for footwear, such as sports and trekking shoes and boots along with shoes for business and fashion shoe soles, as well as high-quality safety shoes.

SUMMARY OF THE INVENTION

Embodiments of the present disclosure provide polyurethane foam produced in a "one shot process" that having low density (no greater than 400 g/L) are semi-hard (Asker C hardness of 25 to 70), display a high rebound value (vertical rebound of 55% to 65%) all while providing superior split tear performance. It has been surprisingly found that the use of both water and expandable microspheres as the blowing agent with polytetramethylene ether glycol (PTMEG) as the only polyols provides a polyurethane foam that display the above properties. The polyurethane foam of the present disclosure differs significantly from the prior art polyurethane foam is that, as noted, the blowing agent used in this polyurethane foam is the combination of water and expandable microspheres.

The polyurethane foam of the present disclosure has a density of 150 to 400 g/L measured according to DIN EN ISO 845 and is formed by reacting a mixture that includes 80 to 50 weight percent (wt. %) of a polyol formulation and 20 to 50 wt. % of an isocyanate prepolymer, where the wt. % is based on the total weight of the mixture. The polyol formulation comprises 90 to 98 wt. % of a polytetramethylene ether glycol (PTMEG) with a weight average molecular weight (MWw) of 1800 to 2100; a blowing agent combination of 0.1 to 6 wt. % of expandable microspheres and 0.5 to 3 wt. % of water; where the wt. % values for the polyol formulation are based on the total weight of the polyol formulation.

The polyol formulation further comprises a catalyst, a surfactant, a crosslinking agent, and other optional additives as ingredients in the polyol where the catalyst, the surfactant, the crosslinking agent, and other optional additives together bring the wt. % of the polyol formulation to 100 wt. %.

The isocyanate prepolymer includes 40 to 70 wt. % of an isocyanate component having at least 92 wt. % of 4,4'-diphenylmethane diisocyanate; and 30 to 60 wt. % of the PTMEG, based on the total weight of the isocyanate prepolymer, wherein the NCO value of the isocyanate prepolymer is 15 to 22. The mixture described herein does not include other polyols in either the polyol formulation or the isocyanate prepolymer. In other words, there is only one polyol PTMEG in the mixture that forms the polyurethane foam of the present disclosure.

For the embodiments, the polyol formulation includes 0.8 to 2 wt. % of water. In additional embodiments, the polyol formulation includes 1.4 to 2 wt. % of water.

For the embodiments, the polyol formulation includes 0.5 to 5 wt. % of expandable microspheres. In additional embodiments, the polyol formulation includes 1 to 5 wt. % of expandable microspheres.

As mentioned, the polyurethane foam has an Asker C hardness of 25 to 70 measured according to ASTM D2240. In addition, the polyurethane foam of the present disclosure can preferably have an Asker C hardness of 30 to 55, more preferably 35-55, measured according to ASTM D2240.

As mentioned, the polyurethane foam has a vertical rebound of 55% to 65% measured according to ASTM D2632.

The present disclosure also provides for a method of forming the polyurethane foam. The method includes preparing the polyol formulation by admixing at room temperature (23° C.) and melting PTMEG at 70° C. overnight and then kept at 40-50° C. for a better handling and dosing together with other components; heating a polyol formulation to a temperature of 40 to 45° C. inside a stirred reactor tank of a polyurethane foam machine, and heating an isocyanate prepolymer to a temperature of 30 to 45° C. inside an isocyanate tank of a polyurethane foam machine; admixing the isocyanate prepolymer with the polyol formulation at atmospheric pressure and pour the mixture using the polyurethane foam machine into a heated mold with desired shape, where the mixture has 50 to 80 weight percent of a polyol formulation and 20 to 50 wt. % of an isocyanate prepolymer; closing the mold, allowing the reactants to fill the mold and reacting for given demolding time from 5 to 15 minutes to form a polyurethane foam.

The polyurethane foam of the present disclosure can be used in a "one shot process" to produce a shoe sole, a mid-sole or an insole for a shoe. The shoe sole may be used for forming an outer sole of a sandal type shoe, a midsole of an athletic type shoe, or an insole for insertion into any type of shoe.

DETAILED DESCRIPTIONS

Embodiments of the present disclosure provide polyurethane foam produced in a "one shot process" that having low density (no greater than 400 g/L) are semi-hard (Asker C hardness of 25 to 70), display a high rebound value (vertical rebound of 55% to 65%) all while providing superior split tear performance. It has been surprisingly found that the use of both water and expandable microspheres as the blowing agent with polytetramethylene ether glycol (PTMEG) as the only polyol provides a polyurethane foam that display the above properties. The polyurethane foam of the present disclosure differs significantly from the prior art polyurethane foam is that, as noted, the blowing agent used in this polyurethane foam is the combination of water and expandable microspheres.

The polyurethane foam of the present disclosure is ideal for the production of comfortable, single density shoe soles, mid-soles and/or insoles for casual applications, such as athletic or technical shoes. In addition, the polyurethane foam of the present disclosure is superior to other PU foams in terms of rebound and split tear. In addition, the only polyols used in forming the polyurethane foam is PTMEG and the blowing agents used are a combination of water and expandable microspheres. The blowing agent combination of water and expandable microspheres used together with solo polyols (PTMEG) in a "one shot" process of the present disclosure surprising gives a semi-hard PU foam with low density, high resiliency and superior split tear. In addition, the polyurethane foam of the present disclosure has good processing, cures well, has good surface quality and shows minimal shrinkage at demold, although its density is low.

The polyol formulation of the present disclosure includes 0~5 wt. % at least one extra diol chain extender agent, where the wt. % are based on the total weight of the polyol formulation. In additional embodiments, the polyol formulation includes 0.5~5 wt. % extra diol chain extender agent. Preferably, a mixture used to form the polyurethane foam does not include extra diol chain extender agent in the present disclosure. The extra chain extender agents for polyurethane are usually low molecular weight alcohol or amine compounds with two hydroxyl or amine functional groups. The examples of commonly used diol chain extenders are but not limited to 1,2-propanediol, 1,3-propanediol, 1,4-butanediol (BDO), 1,2-pentanediol, 1,3-pentanediol, 1,10-decanediol, 1,2-dihydroxycyclohexane, 1,3-dihydroxycyclohexane, 1,4-dihydroxycyclohexane, monoethylene glycol (MEG), diethylene glycol and triethylene glycol, dipropylene glycol and tripropylene glycol, 1,6-hexanediol and bis(2-hydroxyethyl) hydroquinone.

The polyurethane foam of the present disclosure has a density of 150 to 400 grams/liter (g/l) measured according to DIN EN ISO 845. Preferably, the polyurethane elastomer foam of the present disclosure has a density of 250 g/l to 350 g/l measured according to DIN EN ISO 845. This density of the polyurethane foam means the averaged density over the entire polyurethane foam. The polyurethane foam of the present disclosure also has an Asker C hardness of 25 to 70, as measured by ASTM D2240. Preferably, the polyurethane foam of the present disclosure has an Asker C hardness of 30 to 55 measured according to ASTM D2240. More preferably the polyurethane foam of the present disclosure has an Asker C hardness of 35 to 55, measured according to ASTM D2240. The polyurethane foam of the present disclosure also has a vertical rebound of 55% to 65% measured according to ASTM D2632. In addition, the polyurethane foam of the present disclosure preferably targets a compression set of no greater than 20% as measured according to ASTM D 395. Other properties of the polyurethane elastomer foam include a tear strength ranging from 7 to 10 N/mm measured according to ASTM D624; a tensile strength of 1.5 to 3 N/mm$^2$ as measured according to DIN 53504; elongation at break of 350 to 450% as measured according to DIN 53504; The polyurethane foam of the present disclosure also has a split tear in a range of 1.2 to 5 N/mm, where the method for measuring the split tear is described in the Examples section below.

The polyurethane foam described herein is formed by reacting a mixture that includes 80 to 50 weight percent (wt. %) of a polyol formulation and 20 to 50 wt. % isocyanate prepolymer, where the wt. % is based on the total weight of the mixture. Preferably, the mixture includes 70 to 55 wt. % of the polyol formulation and 30 to 45 wt. % isocyanate prepolymer, where the wt. % is based on the total weight of the mixture. More preferably, the mixture includes 59 to 57 wt. % of the polyol formulation and 41 to 43 wt. % isocyanate prepolymer, where the wt. % is based on the total weight of the mixture. The wt. % of the polyol formulation and the isocyanate pre-polymer forming the mixture can add up to 100 wt. % where the wt. % is based on the total weight of the mixture.

The polyol formulation includes 90 to 98 wt. % of a solo glycol of a polytetramethylene ether glycol (PTMEG) with a weight average molecular weight (MWw) of 1800 to 2100, where the wt. % are based on the total weight of the polyol formulation. The polyol formulation consisting of 90 to 96 wt. % of the PTMEG described herein is preferred. The polyol formulation consisting of 93 to 96 wt. % of the PTMEG is more preferred. In one embodiment, the polyol formulation preferably consists of 94.8 wt. % of the PTMEG described herein. In an additional preferred embodiment, the polyol formulation preferably consists of 94.3 wt. % of the PTMEG described herein.

Examples of the PTMEG include TERATHAE® PTMEG 2000 commercially available from INVISTA. TERATHANE® PTMEG 2000 has a weight average molecular weight of 1900 to 2100 and a hydroxyl number (mg KOH/gm) of 53.4 to 59.1. Other examples of PTMEG suitable for the present disclosure include PolyTHF 2000, commercially available from BASF, which has a weight average molecular weight of 1950 to 2050, and a hydroxyl number (mg KOH/gm) of 54.7 to 57.5. Other PTMEGs having a MWw of 1800 to 2100 and a hydroxyl number of about 53 to about 60 are commercially available and would be suitable for the present disclosure.

The polyol formulation further includes a blowing agent combination of water and expandable microspheres. For the various embodiments, the water is present in the polyol formulation from 0.5 to 3 wt. % and the expandable microspheres are from 0.1 to 6 wt. %, where the wt. % are based on the total weight of the polyol formulation. Preferably, the water is present in the polyol formulation from 0.8 to 2 wt. %. More preferably, 1.4 to 2 wt. % of the water is present in the polyol formulation. The expandable microspheres are preferably present in the polyol formulation from 0.5 to 5 wt. %, more preferably from 1 to 5 wt. %, where the wt. % are based on the total weight of the polyol formulation.

Expandable microspheres are hollow microbeads comprise a thermoplastic polymer shell (such as polyacrylonitrile or copolymers thereof) encapsulating a hydrocarbon gas. When heated, the thermoplastic shell encapsulating the hydrocarbon gas softens. Concurrent with the softening of the thermoplastic shell, the gas expands and exerts an increasing pressure on the shell resulting in an increase in the volume of the microspheres. The temperature to which the material is exposed during reaction processing causes the plastics shell to soften and simultaneously causes the enclosed gas to expand. The result is that the microspheres expand. The expandability of the microspheres may be described by determining their TMA density [kg/m$^3$] (Mettler Toledo Stare thermal analysis system; heating rate 20° C./min). The TMA density here is the minimum achievable density at a certain temperature $T_{max}$ at atmospheric pressure prior to collapse of the microspheres. Any thermally expandable microspheres can be used in the present invention. However, microspheres containing hydrocarbons, in particular aliphatic or cycloaliphatic hydrocarbons, are preferred. The term "hydrocarbon" as used herein is intended to include non-halogenated and partially or fully halogenated hydrocarbons. Examples of expandable microspheres suitable for use in this disclosure include without limitation EXPANCEL WU, EXPANCEL DU, EXPANCEL SL and EXPANCEL MB series which are expandable microspheres commercially available from AkzoNobel company and ADVANCELL EM which are expandable microspheres commercially available from Sekisui Chemical Company. Other expandable microspheres that are commercially available or known to one skilled in the art are also suitable for use in this invention.

The polyol formulation further includes a catalyst, a surfactant, a crosslinking agent, and other optional additives as ingredients in the polyol formulation. For the various embodiments, the catalyst, the surfactant, the crosslinking agent, and other optional additives together bring the wt. % of the polyol formulation to 100 wt. %.

As catalysts, it is possible to use all compounds which accelerate the reaction between isocyanate groups and hydroxyl groups. Such compounds are known and are described, for example, in "Kunststoffhandbuch, volume 7, Polyurethane", Carl Hanser Verlag, 3$^{rd}$ ed. 1993, chapter 3.4.1. These compounds include amine-based catalysts, catalysts based on organic metal compounds and tetraalkylstannoxy based catalysts. Examples of amine based catalysts include a triethylendiamine (TEDA) based catalyst, a triethanolamine (TEA) based catalyst, a diisopropylethanolamine (DIEA) based catalyst, a pentamethyldiethylentriamine based catalyst, a tertamethyl butanediamine based catalyst, a dimethylcyclohexylamine based catalyst, a bis (dimethylaminopropyl)methylamine based catalyst, a bis(2-dimethylaminoethyl) ether and a 1,8-Diazabicyclo[5.4.0] undec-7-ene (DBU) based catalyst. Other examples of suitable catalysts include 2,3-dimethyl-3,4,5,6-tetrahydropyrimidine, tertiary amines such as triethylamine, tributylamine, dimethylbenzylamine, N-methyl, N-ethyl, N-cyclohexylmorpholine, N, N, N',N'-tetramethylethylenediamine, N, N, N',N'-tetramethyl-butanediamine, N, N, N',N'-tetramethyl-hexanediamine, pentamethyl-diethylenetriamine, Tetramethyldiaminoethylether, bis-(dimethylaminopropyl)-urea, N,N-dimethylbenzylamine, dimethylpiperazine, 1,2-dimethylimidazole, 1-methylimidazole, 1-azabicyclo (3,3,0) octane and preferably 1,4-diazabicyclo (2,2,2) octane and alkanolamine compounds such as triethanolamine, triisopropanolamine, N-methyl- and N-ethyldiethanolamine and dimethylethanolamine. Examples of organic metal catalyst compounds include zinc salts such as zinc octoate, organic tin compounds such as tin (II) salts of organic carboxylic acids, tin (II) acetate, tin (II) octoate, tin (II) ethylhexanoate and tin (II) laurate, and the dialkyl tin (IV) salts of organic carboxylic acids, dibutyltin diacetate, dibutyltin dilaurate, dibutyltin maleate and dioctyltin diacetate, and also bismuth, such as bismuth (III) neodecanoate, bismuth 2-ethylhexanoate and bismuth octanoate or mixtures thereof. The amine based catalysts can be used alone or in combination with organic metal catalyst compounds. The catalyst may represent from 0.01 wt. % to 2 wt. % based on the total weight of the polyol formulation.

Examples of commercially available catalysts include DABCO® EG (EVONIK Nutrition & Care GmbH), DABCO® 33 LM (Air Products/Evonik), MAX™ A-I Catalyst (Momentive Performance Materials Inc.); FOMREZ™ UL 22 (Momentive Performance Materials Inc.); DABCO® BDMA (Air Products) and DABCO® XD 102 (Air Products/Evonik).

Surfactants suitable for the present disclosure include silicone-comprising surfactants such as siloxane-oxyalkylene copolymers and other organopolysiloxanes. Alkoxylation products of fatty alcohols, oxo alcohols, fatty amines, alkylphenols, dialkylphenols, alkylcresols, alkylresorcinol, naphthol, alkylnaphthol, naphthylamine, aniline, alkylaniline, toluidine, bisphenol A, alkylated bisphenol A, polyvinyl alcohol and also further alkoxylation products of condensation products of formaldehyde and alkylphenols, formaldehyde and dialkylphenols, formaldehyde and alkylcresols, formaldehyde and alkylresorcinol, formaldehyde and aniline, formaldehyde and toluidine, formaldehyde and naphthol, formaldehyde and alkylnaphthol and also formaldehyde and bisphenol A or mixtures of two or more of these foam stabilizers can also be used. Examples of such surfactants include DABCO® DC 193 (Air Products) and TEGOSTAB™ B 2114 (EVONIK Nutrition & Care GmbH) and DABCO® DC 3043 (Air Products). The surfactants may represent from 0.05 wt. % to 3 wt. % based on the total weight of the polyol formulation.

Crosslinking agents used for the present disclosure include, but are not limited to, low-molecular weight compounds containing at least two moieties selected from hydroxyl groups, primary amino groups, secondary amino groups, and other active hydrogen-containing groups which are reactive with an isocyanate group. Crosslinking agents include, for example, polyhydric alcohols (especially trihydric alcohols, such as glycerol and trimethylolpropane), polyamines, and combinations thereof. Non-limiting examples of polyamine crosslinking agents include diethyltoluenediamine, chlorodiaminobenzene, diethanolamine, diisopropanolamine, triethanolamine, tripropanolamine, 1,6-hexanediamine, and combinations thereof. Typical diamine crosslinking agents comprise twelve carbon atoms or fewer, more commonly seven or fewer. Examples of such crosslinking agents include Diethanolamine pure (BASF) or Glycerine (DOW). The crosslinking agents may represent from 0.05 wt. % to 3 wt. % based on the total weight of the polyol formulation.

The isocyanate pre-polymer includes 40 to 70 wt. % of an isocyanate blend having at least 92 wt. % of 4,4'-diphenylmethane diisocyanate, and 30 to 60 wt. % of the PTMEG, based on the total weight of the isocyanate prepolymer, wherein the NCO value of the isocyanate prepolymer is 15 to 22. Preferably, the NCO value of the isocyanate prepolymer the isocyanate prepolymer is 18 to 20. Preferably, the isocyanate prepolymer includes 60 to 65 wt. % of the isocyanate blend and 35 to 40 wt. % of the PTMEG. Preferably, the isocyanate blend can include 93 to 100 wt. % of 4,4'-diphenylmethane diisocyanate and 7 to 0 wt. % of 2,4'-MDI, uretonimine or carbodiimide modified 4,4'-MDI. More preferably, the isocyanate blend can include 96 to 98 wt. % of 4,4'-diphenylmethane diisocyanate and 4 to 2 wt. % of carbodiimide modified 4,4'-MDI. Example of such isocyanate prepolymer includes Isocyanate prepolymer ISO 136/26 (BASF).

The polyurethane forming composition of the present invention may further comprise one or more additional additives, such as pigments, reinforcing materials such as glass fibers, anti-hydrolysis agents, antistatic agents, flame retardants, anti-oxidants and anti-abrasion agents etc. Each of the additional additives, when present, can be added to either of the polyol formulation or the isocyanate prepolymer.

The present disclosure also provides for a method of forming the polyurethane foam. The method includes preparing the polyol formulation by admixing at room temperature (23° C.) and melting PTMEG at 70° C. overnight and then kept at 40-50° C. for a better handling and dosing together with other components; heating a polyol formulation to a temperature of 40 to 45° C.; heating an isocyanate prepolymer to a temperature of 30 to 45° C. inside an isocyanate tank of a polyurethane foam machine, and admixing the isocyanate pre-polymer with the polyol formulation at atmospheric pressure and pour the mixture using the polyurethane foam machine into a heated mold with desired shape; closing the mold, allowing the reactants to fill the mold and reacting for given demolding time to form a polyurethane foam. The polyurethane forming composition of the present invention in the method has 50 to 80 weight percent of a polyol formulation and 20 to 50 wt. % of an isocyanate prepolymer, wherein the wt. % is based on the total weight of the polyurethane forming composition.

The polyurethane foam according to the present disclosure is preferably produced by the one shot process using a low-pressure or a high-pressure technique in closed mold, advantageously heated molds. The polyurethane elastomer foam according to the present disclosure can also be produced in an open mold using a pouring or casting machine, as are known. The molds are usually metal (e.g., aluminum or steel) and set to a temperature of 50 to 60° C. The demolding time is from 5 to 15 min. Optionally, the forms may already contain other parts of the shoe sole, such as the outer sole or parts of the midsole.

BRIEF DESCRIPTION OF THE FIGURES

FIG. 1 Shows a split tear test specimen after preparation for test showing position of splits and mark.

EXAMPLES

The following examples are provided to illustrate various embodiments, but are not intended to limit the scope of the claims. All components purchased from commercial vendors and used as received unless otherwise noted. All percentages are weight percentages (wt. %) based on the total weight of the mixture used to form the polyurethane elastomer foam, unless otherwise noted.

The components used for preparing the polyurethane elastomer foam of the following Examples are listed in Table 1.

TABLE 1

Components and Commercial Sources

| Components | Source |
| --- | --- |
| PolyTHF ® 2000 | BASF |
| DABCO ® DC 193 | Air Products |
| DABCO ® EG | Evonik |
| Expancel 031 DU 40 | Akzo Nobel |
| Diethanolamine pure | BASF |
| Isocyanate prepolymer ISO 136/26 | BASF |

Mechanical properties are determined according to the procedure listed in the following standards in Table 2

TABLE 2

Test standards of Mechanical properties

| Item | Standards | Version | Specific information |
| --- | --- | --- | --- |
| Density | DIN EN ISO 845 | June 1995 | |
| Hardness Asker C | ASTM D2240 | Designation: D 2240 - 05 | Reference type C |
| Rebound Vertical | ASTM D2632 | Designation: D2632 - 01 (Reapproved 2014) | |
| Tensile strength | DIN 53504 | May 1994 | Test type: S1, test speed: 500 mm/min |
| Elongation | DIN 53504 | May 1994 | Test type: S1, test speed: 500 mm/min |
| Tear strength | ASTM D624 | Designation: D 624 - 00 (Reapproved 2007) | Test type: Die C, test speed: 500 mm/min |
| Compression set | ASTM D 395 | Designation: D 395 - 03 (Reapproved 2008) | Method B |
| Split tear | Internal | N/A | Details are described as below |

Split Tear Test Method

The split tear test is based on the SATRA TM65 (1992), keep the same preparation of test specimens according to article 5, while the sample size was modified to a thickness of 10±1 mm and cutting 3 rectangular 25±1 mm×160±5 mm from the sheet material.

Procedure is as below;
1 Split one end of each test piece midway between the top and bottom surfaces for a distance of 16±4 mm. Then make 4 successive 30 mm portions on specimen as shown in FIG. 1. The cutting tools and method are according to article 6.1 and 6.2.
2 Operate the machine with a jaw separation rate of 100±10 mm/min until the split has propagated by each four 30 mm which indicated by the mark in FIG. 1 or has run to the surface. If the split does not propagate along the center of the test specimen but instead reaches the surface before 120 mm (4×30 mm) mark is reached, the value is not counted.

3 Repeat the procedure in above 2 for the other two specimens.

Data Collection & Analysis

1 Record the lowest values for each of the four portions of each specimen. Calculate the average value of four lowest value of each specimen and record the results in the unit of N/mm.

2 Report the average value for each sample.

Table 3 below lists Comparative Examples 1, which include various polyol formulations but exclude expandable microspheres in Comparative Example 1.

To form the polyurethane elastomer foam of Example 1-6, heat the formulated polyol formulation at their given weight percent (wt. %) to a temperature of 40 to 45° C. inside the stirred reactor tank and heat the isocyanate pre-polymer at its given weight percent (wt. %) to a temperature of 30 to 35° C. in an isocyanate tank of a low pressure machine (Zhejiang Haifeng Shoemaking Equipment Co.,Ltd.). Heat an aluminum mold (test plate mold 200×200×10 mm) to a temperature of 55° C. Admix given parts in the table 3 of the isocyanate pre-polymer with 100 parts by weight of the polyol formulation at atmospheric pressure and pour the admixture using the low pressure machine into the heated aluminum mold. Close the mold, allow the reactants to fill the mold and react for given demolding time in the table 3. Open the mold and demold the polyurethane elastomer foam. Allow the polyurethane elastomer foam to cure for 24 hours at 25° C. and 50% relative humidity before testing the physical properties of the polyurethane elastomer foam.

TABLE 3

Comparison of Mechanical Properties of Polyurethane foam of Examples 1 to 6 Against Comparative Example 1 of Polyurethane foam without expandable microspheres

|  | Comparative example 1 | 1 | 2 | 3 | 4 | 5 | 6 |
|---|---|---|---|---|---|---|---|
| PTHF ® 2000 | 96.4 | 94.9 | 94.8 | 94.3 | 93.7 | 90.8 | 92.3 |
| Water | 0.8 | 0.8 | 1.4 | 1.4 | 2.0 | 1.4 | 1.4 |
| Expancel 031 DU40 | 0 | 1.5 | 1.0 | 1.5 | 1.5 | 5 | 1.5 |
| DABCO ® DC 193 (Silicone oil) | 0.5 | 0.5 | 0.5 | 0.5 | 0.5 | 0.5 | 0.5 |
| DABCO ® EG (Amine catalyst) | 2 | 2 | 2 | 2 | 2 | 2 | 2 |
| Diethanolamine pure (Crosslinking agent) | 0.3 | 0.3 | 0.3 | 0.3 | 0.3 | 0.3 | 0.3 |
| MEG (Chain extender) |  |  |  |  |  |  | 2.0 |
| Isocyanate prepolymer | 49.7 | 49.7 | 63.2 | 63.2 | 76.5 | 61.1 | 77.4 |
| NCO content of Isocyanate prepolymer | 18.0 | 18.0 | 18.0 | 18.0 | 18.0 | 18.0 | 18.0 |
| Demolding time (min) | 7 | 7 | 7 | 7 | 10 | 7 | 7 |
| Density(g/L) | 280 | 280 | 280 | 280 | 280 | 280 | 280 |
| Hardness (Asker C) | 36 | 38 | 57 | 55 | 62 | 57 | 53 |
| Rebound(%) | 64 | 63 | 62 | 61 | 58 | 57 | 53 |
| Split tear (N/mm) | 0.86 | 1.28 | 2.05 | 2.23 | 2.76 | 2.6 | 1.90 |
| Compression set % | 14.5 | 19.3 | 13.2 | 14 | 6.8 | 19.8 | 17.4 |
| Tensile strength (N/mm$^2$) | 1.83 | 1.88 | 2.42 | 2.3 | 2.66 | 2.06 | 2.23 |
| Elongation (%) | 456.6 | 447.6 | 383.6 | 386.7 | 411.3 | 372.4 | 362.8 |
| Tear strength (N/mm) | 6.86 | 7.09 | 8.56 | 8.45 | 9.94 | 9.05 | 8.64 |

The properties of Examples 1 and Comparative Examples 1 seen in Table 3 demonstrate that the absence of expandable microspheres has a negative impact on the split tear of the polyurethane foam.

The invention claimed is:

1. A polyurethane foam having a density of 150 to 400 g/L measured according to DIN EN ISO 845, wherein the polyurethane foam is formed by reacting a mixture consisting of:

80 to 50 weight percent (wt. %) of a polyol formulation and 20 to 50 wt. % of an isocyanate prepolymer, wherein the wt. % is based on the total weight of the mixture;

wherein the polyol formulation comprises 90 to 98 wt. % of a polytetramethylene ether glycol (PTMEG) with a weight average molecular weight (MWw) of 1800 to 2100, 0.1 to 6 wt. % of expandable microspheres and 0.5 to 3 wt. % of water, wherein the wt. % values for the polyol formulation are based on the total weight of the polyol formulation.

2. The polyurethane foam of claim 1, further comprising a catalyst, a surfactant, a crosslinking agent, and other optional additives as ingredients in the polyol formulation, wherein the catalyst, the surfactant, the crosslinking agent, and other optional additives together bring the wt. % of the polyol formulation to 100 wt. %.

3. The polyurethane foam of claim 1, wherein the isocyanate pre-polymer includes:

40 to 70 wt. % of an isocyanate component having at least 92 wt. % of 4,4'-diphenylmethane diisocyanate; and 30 to 60 wt. % of the PTMEG, based on the total weight of the isocyanate pre-polymer, wherein the NCO value of the isocyanate prepolymer is 15 to 22.

4. The polyurethane foam of claim 1, wherein the polyol formulation has a water content of 0.8 to 2 wt. % based on the total weight of the polyol formulation.

5. The polyurethane foam of claim 1, wherein the polyol formulation has an expandable microspheres content of 0.5 to 5 wt. % based on the total weight of the polyol formulation.

6. The polyurethane foam of claim 1, wherein the polyurethane elastomer foam has a vertical rebound of 55% to 65% measured according to ASTM D2632.

7. The polyurethane foam of claim 1, wherein the polyurethane elastomer foam has an Asker C hardness of 25 to 70 measured according to ASTM D2240.

8. A shoe sole, a mid-sole or an insole formed from the polyurethane foam of claim 1.

9. A method of forming a polyurethane foam according to claim 1, comprising
  i) preparing a polyol formulation by admixing at room temperature and melting PTMEG at 70° C. overnight and then keeping it at 40 to 50° C. for a better handling and dosing together with other components,
  ii) heating the polyol formulation to a temperature of 40 to 45° C. inside a stirred reactor tank of a polyurethane foam machine,
  iii) heating an isocyanate prepolymer to a temperature of 30 to 45° C. inside an isocyanate tank of a polyurethane foam machine,
  iv) admixing the isocyanate pre-polymer with the polyol formulation at atmospheric pressure and pouring the mixture using the polyurethane foam machine into a heated mold with desired shape, and
  v) closing the mold, allowing the reactants to fill the mold and react for a given demolding time to form a polyurethane foam.

10. The method of claim 9, wherein the polyurethane forming composition has 50 to 80 weight percent of a polyol formulation and 20 to 50 wt. % of an isocyanate prepolymer, wherein the wt. % is based on the total weight of the polyurethane forming composition.

11. The method of claim 9, wherein the heated mold has a temperature of 50 to 60° C. and the demolding time is from 5 to 15 min.

12. The polyurethane foam of claim 1, wherein the polyol formulation has a water content of 1.4 to 2 wt. % based on the total weight of the polyol formulation.

13. The polyurethane foam of claim 1, wherein the polyol formulation has an expandable microspheres content of 1 to 5 wt. % based on the total weight of the polyol formulation.

14. The polyurethane foam of claim 1, wherein the polyurethane elastomer foam has an Asker C hardness of 30 to 55 measured according to ASTM D2240.

15. The polyurethane foam of claim 1, wherein the polyurethane elastomer foam has an Asker C hardness of 35 to 55 measured according to ASTM D2240.

* * * * *